(12) United States Patent
Bugarcic et al.

(10) Patent No.: US 7,766,267 B2
(45) Date of Patent: Aug. 3, 2010

(54) SHELLING AND GRINDING APPARATUS

(76) Inventors: Mildrag M. Bugarcic, 7413 Macedonia Rd., Oakwood, OH (US) 44146; Slavisa S. Bugarcic, 7413 Macedonia Rd., Oakwood, OH (US) 44146

( * ) Notice: Subject to any disclaimer, the term of this patent is extended or adjusted under 35 U.S.C. 154(b) by 0 days.

(21) Appl. No.: 12/369,570

(22) Filed: Feb. 11, 2009

(65) Prior Publication Data
US 2009/0203411 A1  Aug. 13, 2009

Related U.S. Application Data

(60) Provisional application No. 61/065,427, filed on Feb. 11, 2008.

(51) Int. Cl.
*B02C 18/14* (2006.01)
(52) U.S. Cl. .............................. 241/190; 99/567; 460/45
(58) Field of Classification Search .................. 460/107, 460/108, 109, 110, 113, 26–36, 45, 46; 99/567, 99/569; 241/190
See application file for complete search history.

(56) References Cited

U.S. PATENT DOCUMENTS

| | | | |
|---|---|---|---|
| 23,702 A | 4/1859 | Perry | |
| 26,010 A | 11/1859 | Burr | |
| 32,898 A | 7/1861 | Seymour | |
| 200,215 A | 2/1878 | Morris | |
| 272,495 A | 2/1883 | Tarr | |
| 410,399 A | 9/1889 | Brennan | |
| 457,146 A | 8/1891 | Cadwgan | |
| 2,833,485 A | 5/1958 | Rothhaar | |
| 2,853,247 A * | 9/1958 | Anderson | 241/190 |
| 2,970,780 A | 2/1961 | Bowen | |
| 6,358,141 B1 * | 3/2002 | Stukenholtz et al. | 460/100 |

* cited by examiner

*Primary Examiner*—Árpád Fábián-Kovács
(74) *Attorney, Agent, or Firm*—Fay Sharpe LLP

(57) ABSTRACT

An apparatus for reducing and separating an associated agricultural product into two or more sub-parts is provided. A first housing includes an inlet and an outlet, the inlet being configured to receive the associated agricultural product to be reduced. A first reducing assembly is disposed between and in communication with the inlet and the outlet of the first housing and includes a first rotatable reducing member, a second rotatable reducing member, and a reaction member. The first reducing member, the second reducing member and the reaction member are disposed adjacent to the other and cooperate to receive and reduce the associated agricultural product to a plurality of first sub-parts. A second housing includes an inlet and an outlet, the inlet being configured to receive select ones of the plurality of first sub-parts. A second reducing assembly is disposed between and in communication with the inlet and the outlet of the second housing and includes a reducing rotor and a stationary reducing ring. The reducing ring is secured to the second housing and is disposed between the reducing rotor and the outlet of the second housing. The select ones of the plurality of first sub-parts are further reduced to a plurality of second sub-parts by the second reducing assembly and discharged via the outlet of the second housing.

19 Claims, 9 Drawing Sheets

SHELLING AND GRINDING APPARATUS

A claim for domestic priority is made herein under 35 U.S.C. §119(e) to U.S. Provisional App. Ser. No. 61/065,427 filed on Feb. 11, 2008, the entire disclosure of which is incorporated herein by reference.

BACKGROUND

The present application relates to the general field of agricultural and/or animal feed processing equipment. In particular, the present application pertains to equipment capable of shelling and grinding a variety of agricultural type products, e.g., corn. However, other applications are also contemplated.

A common problem which exists in animal feed preparation, particularly in the case of small farming operations, a farmer must rely on a feed grinding service to produce, for example, corn meal from the farmers own on-hand supply of corn. These services are not only expensive, but are also inconvenient in that the farm must schedule an appointment with such a service. Furthermore, such feed grinding equipment is not only large, cumbersome and expensive to purchase, but also very difficult to transport.

Furthermore, the prior art devices typically include a single inline process. As such, a failure of a single component of the assembly will result in the machine or device being entirely unusable until the problem or issue is addressed. Moreover, such devices do not afford the user the ability to select the level of grinding desired. For example, the user may prefer to use or store just the kernels and/or cob portions from a shelled ear of corn rather than grinding the kernels and/or cob into a fine feed grain or meal.

For at least these reasons, a need exists to provide an improved shelling and grinding apparatus while overcoming the aforementioned problems and others.

SUMMARY

According to one aspect of the present invention, an apparatus for reducing and separating an associated agricultural product into two or more sub-parts is provided. A first housing includes an inlet and an outlet, the inlet being configured to receive the associated agricultural product to be reduced. A first reducing assembly is disposed between and in communication with the inlet and the outlet of the first housing. The first reducing assembly includes a first rotatable reducing member, a second rotatable reducing member, and a reaction member. The first reducing member, the second reducing member and the reaction member are disposed adjacent to the other and cooperate to receive and reduce the associated agricultural product to a plurality of first sub-parts. A second housing includes an inlet and an outlet, the inlet being configured to receive select ones of the plurality of first sub-parts. A second reducing assembly is disposed between the inlet and the outlet of the second housing. The second reducing assembly includes a reducing rotor and a stationary reducing ring. The reducing ring is secured to the second housing and is disposed between the reducing rotor and the outlet of the second housing. The select ones of the plurality of first sub-parts are further reduced to a plurality of second sub-parts by the second reducing assembly and discharged via the outlet of the second housing.

According to another aspect of the present invention, a shelling apparatus for separating corn kernels from an associated ear of corn is provided. The apparatus includes a shelling housing including an inlet and an outlet. The inlet is configured to receive the associated ear of corn to be shelled. A shelling assembly is disposed between and in communication with the inlet and the outlet of the first housing. The shelling assembly includes a first rotatable shelling member, a second rotatable shelling member, and a pivotable reaction member, wherein the first shelling member, the second shelling member and the reaction member are disposed adjacent to the other and cooperate to receive and separate from the associated ear of corn a plurality of kernels. A grate is disposed adjacent the outlet of the shelling housing, the grate including a plurality of apertures. The plurality of apertures being sized so as to permit only the plurality of kernels to pass through the grate.

According to yet another aspect of the present invention, a method for shelling corn from an associated ear of corn is provided. The method includes providing a shelling apparatus. The shelling apparatus includes a shelling housing having an inlet and an outlet. The inlet is configured to receive the associated ear of corn to be shelled. A shelling assembly is disposed between and in communication with the inlet and the outlet of the first housing. The shelling assembly includes a first rotatable shelling member, a second rotatable shelling member, and a pivotable reaction member. Wherein, a working surface of the first shelling member, the second shelling member and the reaction member are disposed adjacent one another in a generally triangular shape. The method further includes inserting the associated ear of corn into the inlet of the shelling housing. The associated ear of corn is engaged with the first shelling member, the second shelling member, and the reaction member. The associated ear of corn is rotated while being drawn into the shelling housing. The corn kernels are separated from the associated ear of corn by imparting a generally tangential force on the associated ear of corn via the working surfaces of the first shelling member, the second shelling member, and the reaction member.

BRIEF DESCRIPTION OF THE DRAWINGS

The invention may take form in various components and arrangements of components and various steps and arrangement of steps. The drawings are only for purposes of illustrating various embodiments of the invention and are not to be construed as limiting the invention.

DETAILED DESCRIPTION

Figure 1:
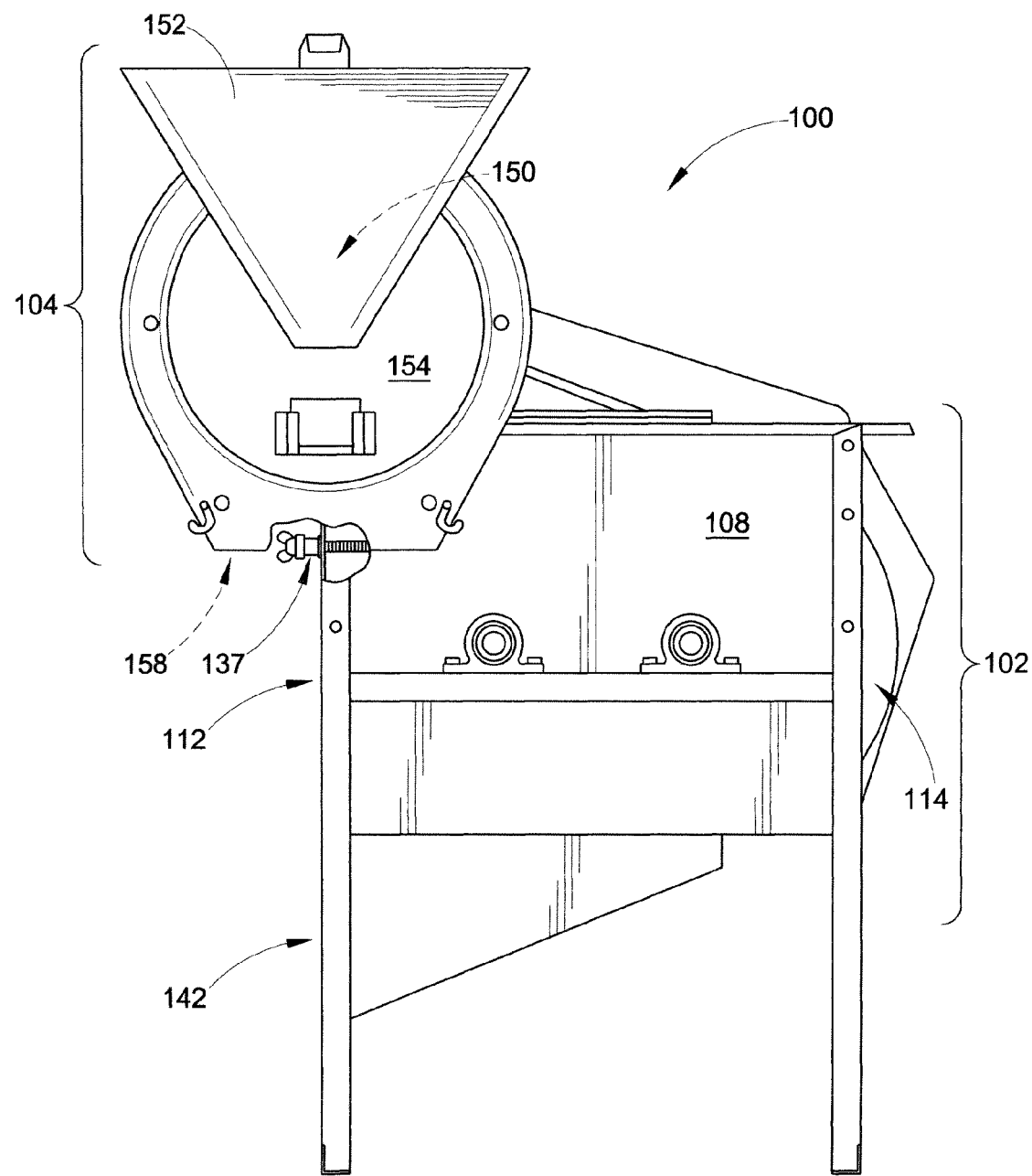
FIG. 1 is a front elevational view of a first embodiment of a shelling and grinding apparatus, according to the present invention.

With reference to FIGS. 1-5, a first embodiment of a shelling and grinding apparatus 100 is shown. The apparatus 100 generally includes a first reducing or shelling housing 102 for shelling or otherwise reducing an agricultural product (e.g., an ear of corn) from a first state (e.g., a raw harvested or husked state) to a second or rough ground state (e.g., a shelled state wherein individual kernels have been removed from a corn cob). In addition, the apparatus 100 includes a second reducing or grinding housing 104 for further grinding or otherwise reducing the agricultural product from the second state to a third state (e.g. a fine ground or meal state). Both the first and second housings 102, 104 may receive a rotational drive input from one or more rotating power sources, such as an electric motor 106. Of course separate driving sources may be used to power the first and second housings 102,104 and the associated reducing assemblies. Naturally, the motor or power source should be sized appropriately and be matched for the desired output characteristics of the apparatus 100 (e.g., so as to handle the desired mass flow rate of processed agricultural product through the apparatus for a given consistency or texture).

Figure 4:
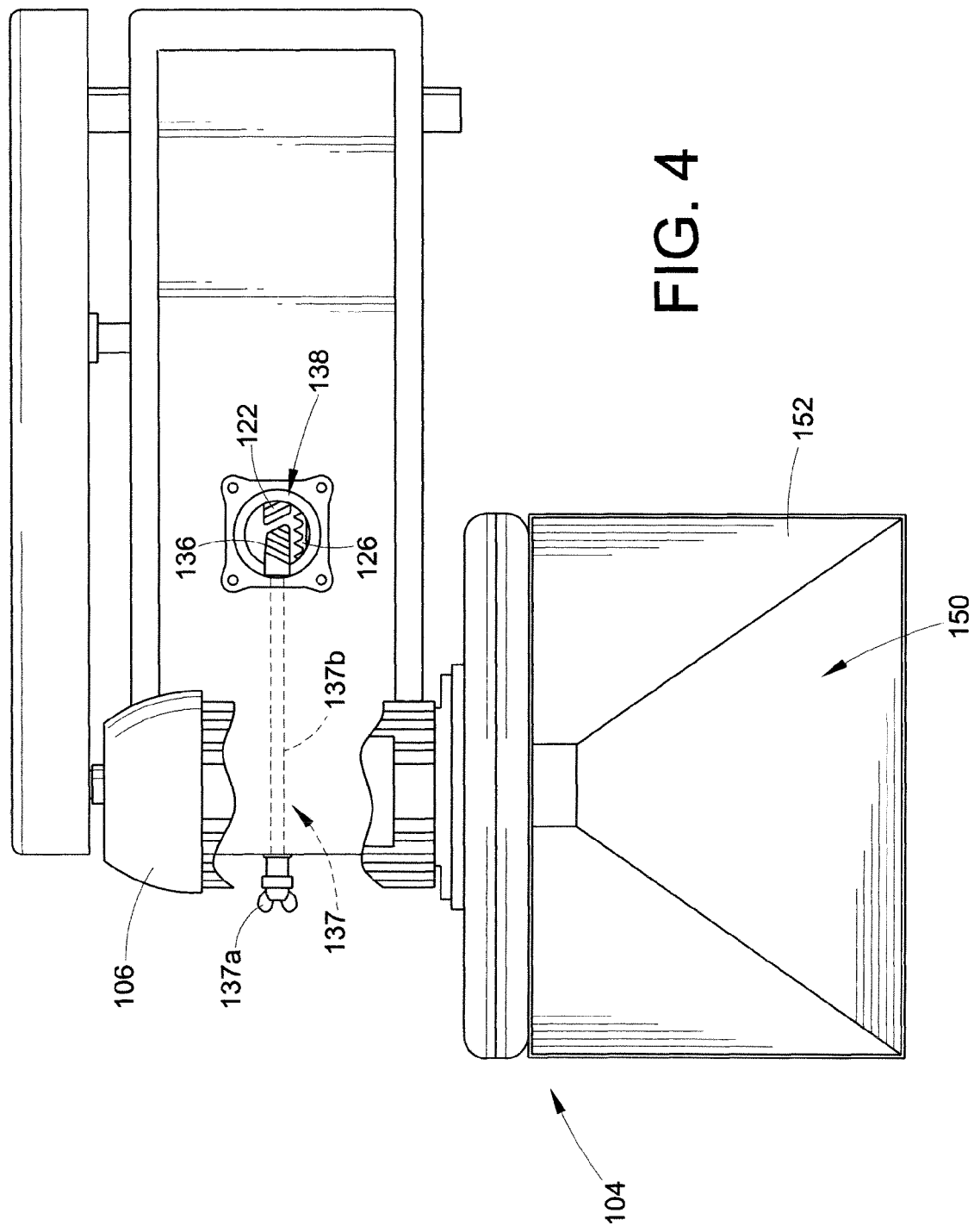
FIG. 4 is a top view of the apparatus of FIG. 1.
Figure 5:
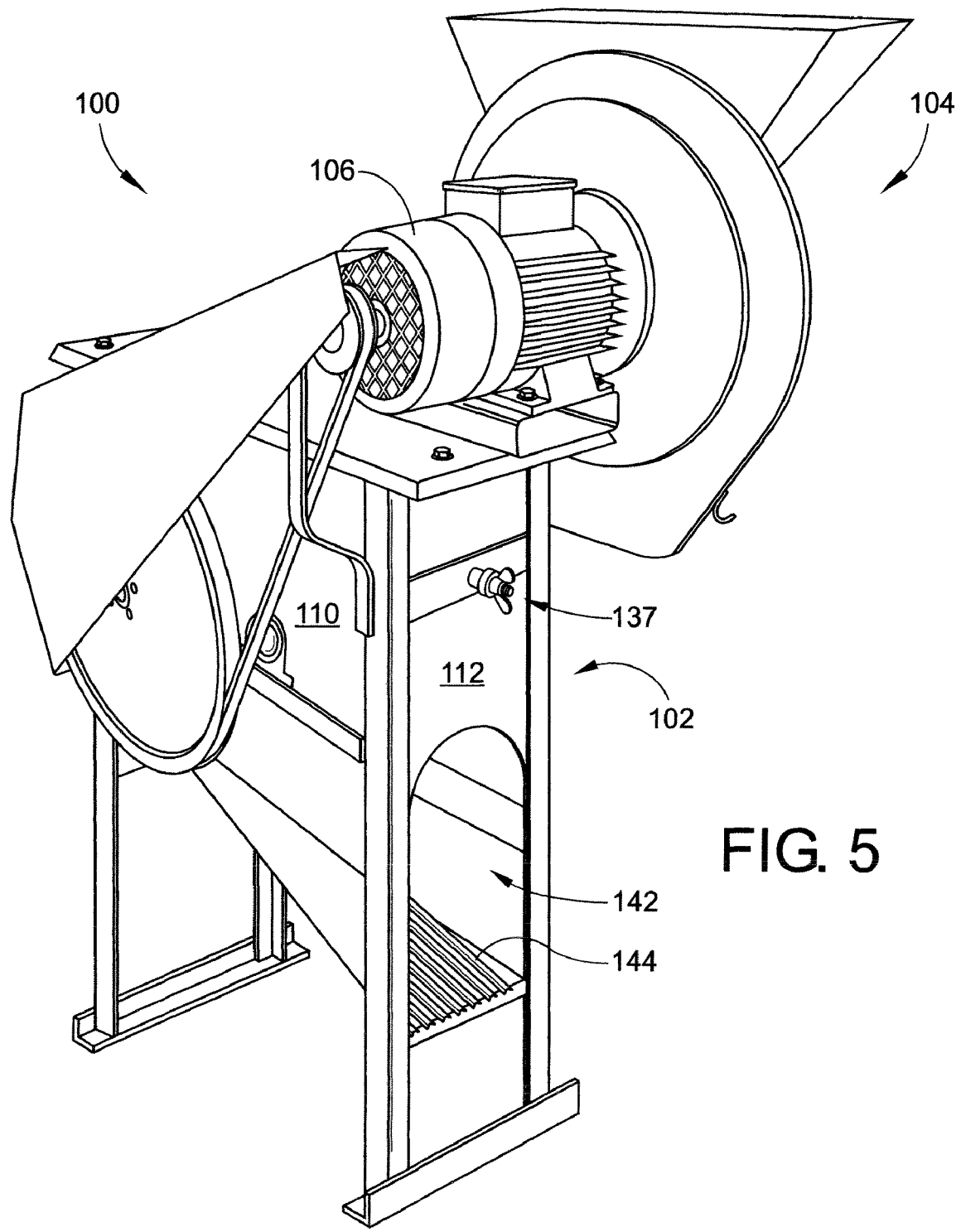
FIG. 5 is a perspective view from a rear side of the apparatus of FIG. 1.
Figure 6:
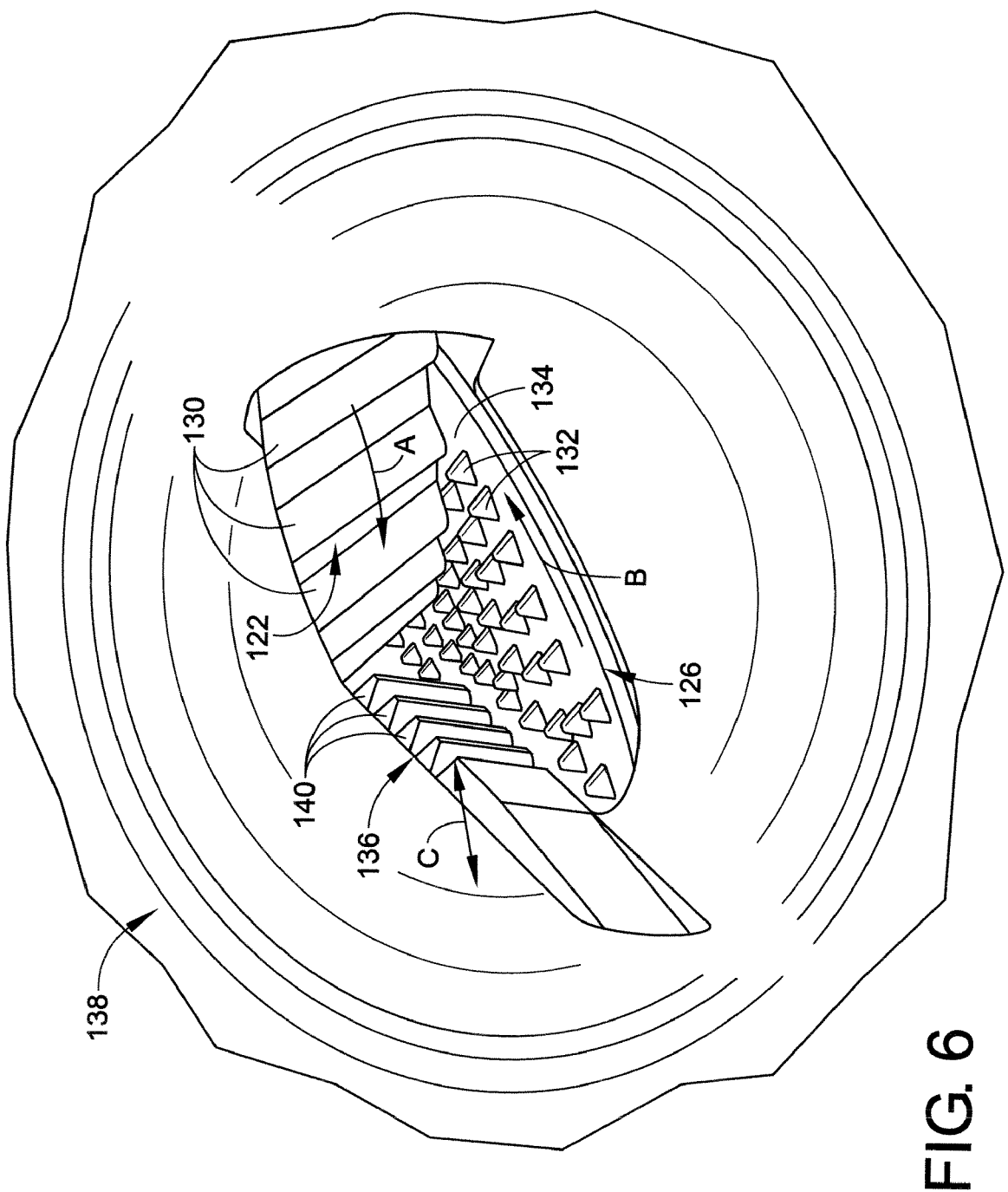
FIG. 6 is an enlarged perspective view of an inlet of a top side of the apparatus of FIG. 4.
Figure 7:
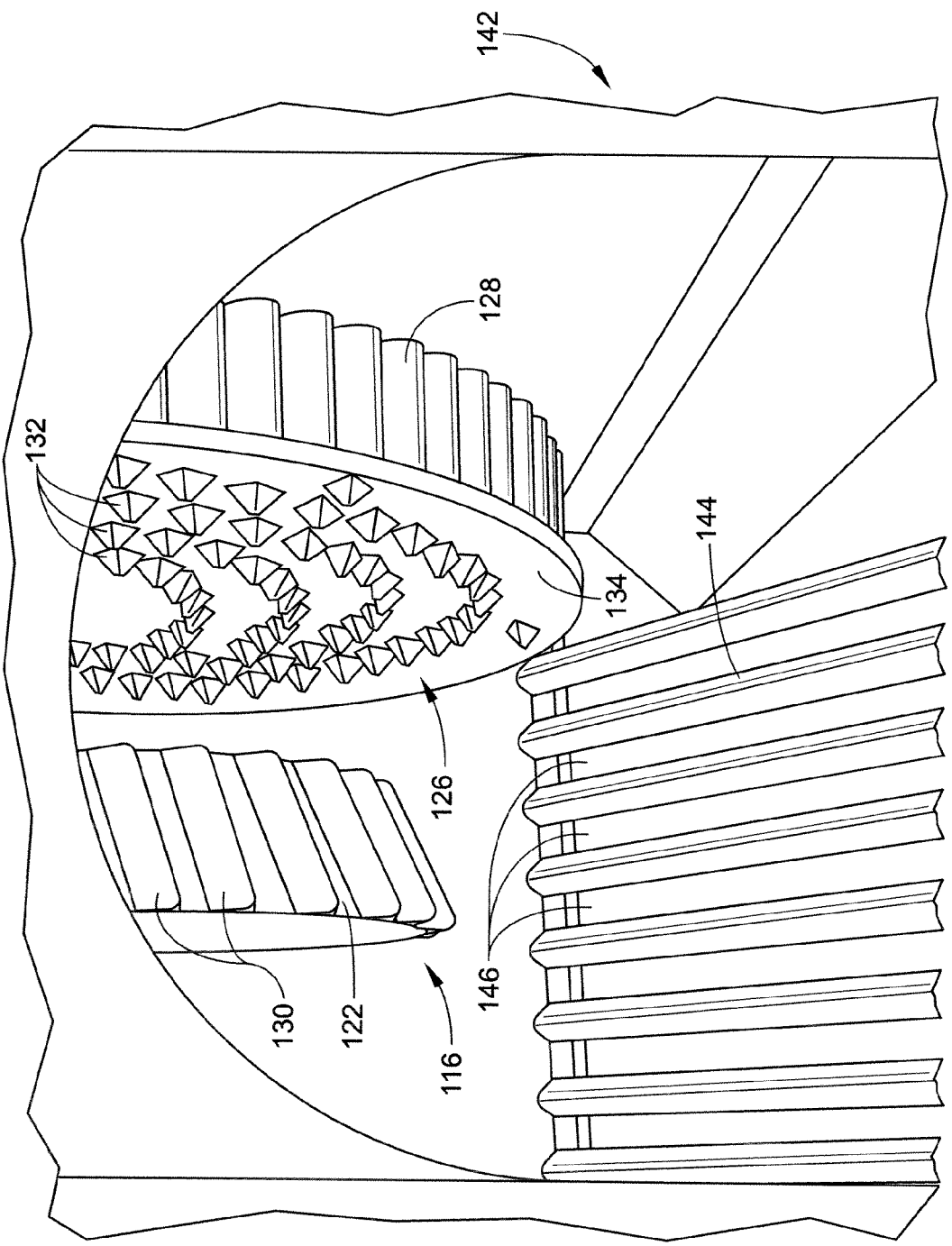
FIG. 7 is an enlarged perspective view of an outlet portion of the apparatus of FIG. 1 illustrating a first and second reducing member.

With continued reference to FIGS. 1-5 and additional reference to FIGS. 6 and 7, the first housing 102 may include a front wall 108, a rear wall 110, a first side wall 112 and a second side wall 114. It should be noted that the terms reducing and or grinding are to be interpreted in their broadest sense and they are used herein to generally connote any action where a given item is reduced in size, crushed, sheared, or otherwise separated into various smaller sub-parts or pieces. Disposed within the first housing 102 is a first reducing or shelling assembly 116. The first reducing or shelling assembly 116 includes a driving shaft 118 and a driven shaft 120. The driving and driven shafts 118,120 rest between a pair journals or bearings that maybe secured to the front and rear walls 108,110 of the housing 102. The driving shaft 118 may include a first reducing or shelling member 122 and a driving gear 124. Generally, torque can be transferred from the driving source or electric motor 106 to the driving shaft 118 via any known mechanism, such as through gears or pulleys. By way of example, the first embodiment employs the use of a pulley system for transferring power from the driving source 106 to the driving shaft 118. The speed is then reduced and the torque increased as the drive power is transferred from the driving shaft 118 through the driving gear 124 to a second reducing or shelling member 126 via an integrated gear 128 that is secured to the driven shaft 120.

As illustrated in FIGS. 6 and 7, both of the first and second reducing members 122, 126 include a plurality of surface features which facilitate the first stage of processing or, as in the case of corn, the shelling and/or cob grinding process. Such surface features can include a plurality of beveled ridges or teeth 130, as illustrated as being disposed about an outer circumference of the first reducing member 122. Similarly, the second reducing member 126 can include a plurality of pyramid-like projections 132 which can be concentrically or randomly disposed about a sidewall 134 of the second reducing member 126.

The first reducing or shelling assembly 116 further includes a reaction member 136 (FIG. 6) which is secured to or proximally to an inlet 138 (FIG. 4) of the first reducing or shelling housing 102 (FIG. 1). In addition, at least a portion of the reaction member can be placed adjacent to both the first and second reducing members such that the agricultural product is urged into contacting all three of these members when fed through the inlet. To further reduce the distance or tolerance between the reaction member and the reducing or working surfaces of the reducing members, the end of the reaction member can be tapered as best illustrated in FIG. 4. One function of the reaction member 136 is to provide a support surface against which the agricultural product to be reduced may rest against during the first stage of processing. It should be noted that the reaction member 136 can be adjusted in a direction C (FIG. 6) such that a generally triangular opening formed between the reaction member 136, the first reducing or shelling member 122, and the second reducing or shelling member 126 can be increased or decreased by operating the reaction member adjustment assembly 137 (FIGS. 1,5,4). As best illustrated in FIG. 4, the adjustment assembly 137 includes an adjustment knob 137a (e.g., a wing nut) that can be threaded onto an adjustment rod 137b. The adjustment rod 137b is attached at a lower end of the reaction member 136 such that when the knob 137a is rotated, the rod 137b is either advanced or retracted depending on the direction of rotation. This causes the reaction member to pivot (in a generally transverse direction to the longitudinal axis of the inlet) and the exit aperture (or the generally triangular opening) within the inlet to increase or decrease in size. In addition or alternately, the adjustment assembly can include a biasing member that continuously biases the reaction member inward toward a central/longitudinal axis of the inlet to the first reducing housing. As such, a continuous and generally even pressure can be consistently applied to the associated agricultural product to be reduced, ground, or shelled so that a particular consistency or texture is yielded.

With reference to FIG. 6, and by way of example only, the first reducing member 122 can spin in a first direction A, while the second reducing member 126 can spin in an opposing direction B. It should be noted that the first reducing member 122 is positioned in a first plane that is generally inline or coincident with a central/longitudinal axis of the inlet 138 and that the second reducing member 126 is positioned in a second plane that is spaced away from but generally parallel to the first plane. This allows the first reducing or shelling assembly to act upon the product to be processed in both a linear and tangential manner. Specifically, as the teeth 130 of the first reducing member 122 rotate downward in the direction A, the agricultural product to be reduced is urged linearly downwards and against the reaction member 136. Simultaneously, the second reducing member 126 via the plurality of projections 132 frictionally engages the agricultural product exerting a generally tangential force and removing, shelling, grinding, and or otherwise reducing portions of the agricultural product. This tangential force can generate a counterclockwise torque (as viewed from above) about the central/longitudinal axis of the agricultural product (or inlet 138) while the agricultural product is being feed into the inlet 138. This torque causes the agricultural product to rotate about its longitudinal axis further enhancing and optimizing the reducing process of the agricultural product.

For purposes of clarity, and by way of example only, the operation of the first reducing or shelling assembly will be discussed with respect to an ear of corn. An ear of corn can be fed directly into the inlet 138. As the first and second reducing or shelling members 122,126 engage the ear of corn, the husk is immediately removed while the cob is rotated about its longitudinal axis. As the cob is rotated, the kernels are sheared or otherwise extracted from the cob as the kernels are impacted by the diamond or pyramid-like projections of the second reducing or shelling member as well as the working surfaces of the first reducing member and/or reaction member. Depending on the depth setting of the reaction member (direction C, FIG. 6), the cob itself can pass between the reaction member and the first and second reducing members and into the lower part of the first reducing or shelling housing substantially intact. Optionally, the reaction member can be advanced so as to close the exit aperture of the inlet (i.e., the opening present between the reaction member, first reducing member, and second reducing member) such that the cob will be ground into relatively small rough pieces. As such, the interactions of the first reducing or shelling member 122, the second reducing or shelling member 126 and reaction member 136 all cooperate to shred, shell, and/or grind all while self-feeding the ear of corn or other agricultural product. It should also be noted that the reaction member 136 may include a plurality of teeth 140 which prevent the agricultural product from sliding out and or from being fed too quickly into the inlet (i.e., the teeth retard the self-feeding action and thereby ensure that the first and second reducing members have an adequate opportunity to engage the entire surface of the agricultural product).

With reference to FIGS. 2, 3, 5 and 7, the first reducing housing 102 further includes an outlet region 142 where a plurality of grindings or sub-parts (e.g., kernels) of the agricultural product are discharged. The outlet 142 also includes a filter or inclined grate 144 which allows a generally finer first portion of the plurality of grindings or sub-parts (e.g., corn kernels) to pass through a series of parallel spaced apertures 146. By contrast, the remaining generally coarse second portion of the plurality of grindings of the agricultural product (e.g., cob, husk, etc.) can slide down and outward of the outlet region 142 so as to be separately collected and/or discarded. By way of example, if an ear of corn is fed into the first housing 102, the husk and kernels are removed/shelled and the cob may be left intact. The kernels will then typically fall through the grate 144, while the husk, cob, and the stem of the ear of corn will not pass through the grate 144 due to their generally coarse or large consistency. Thus, the kernels are automatically separated from the husk and cobs and can be collected by placing a container under the grate 144.

Figure 2:
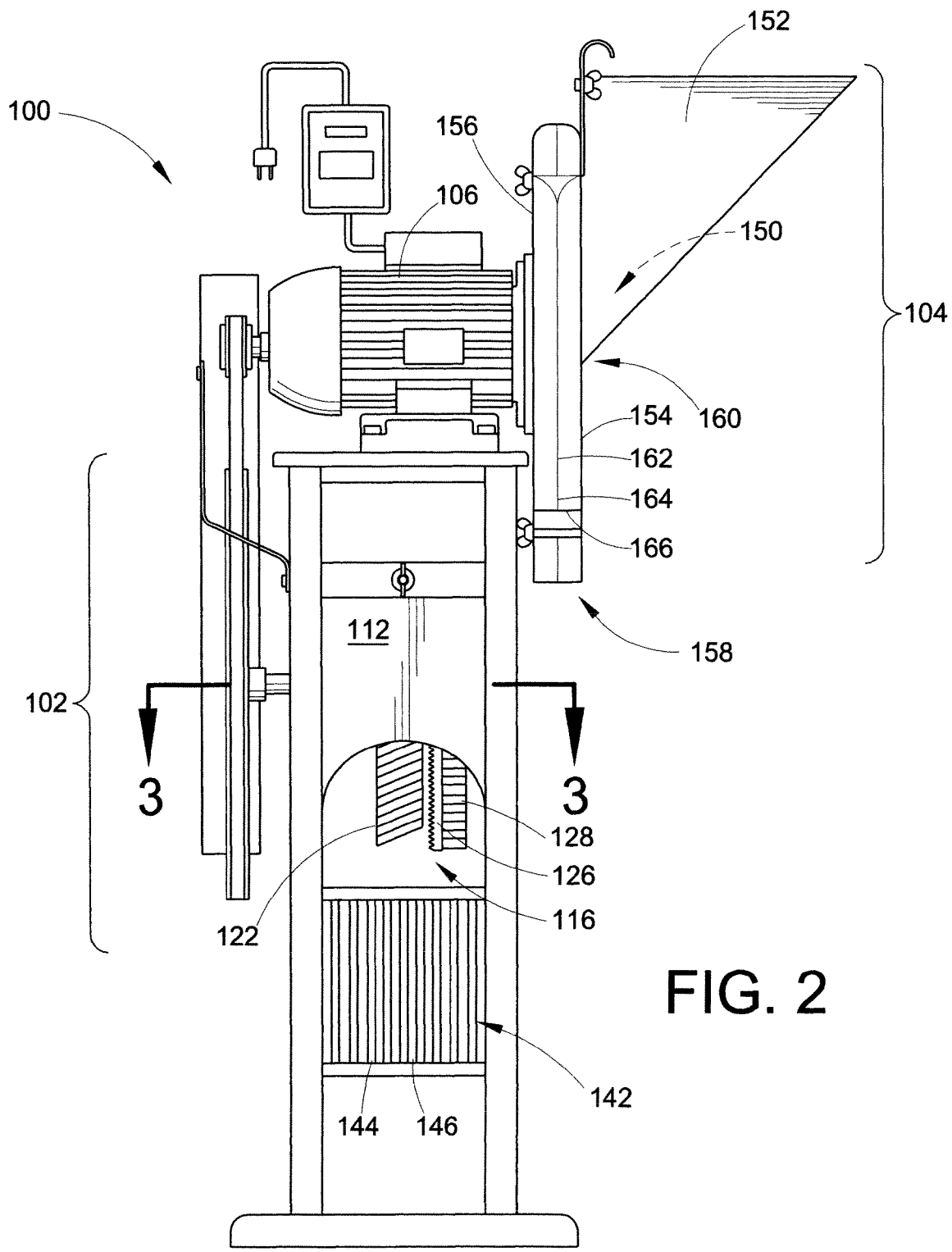
FIG. 2 is a side elevational view of the apparatus of FIG. 1.
Figure 3:
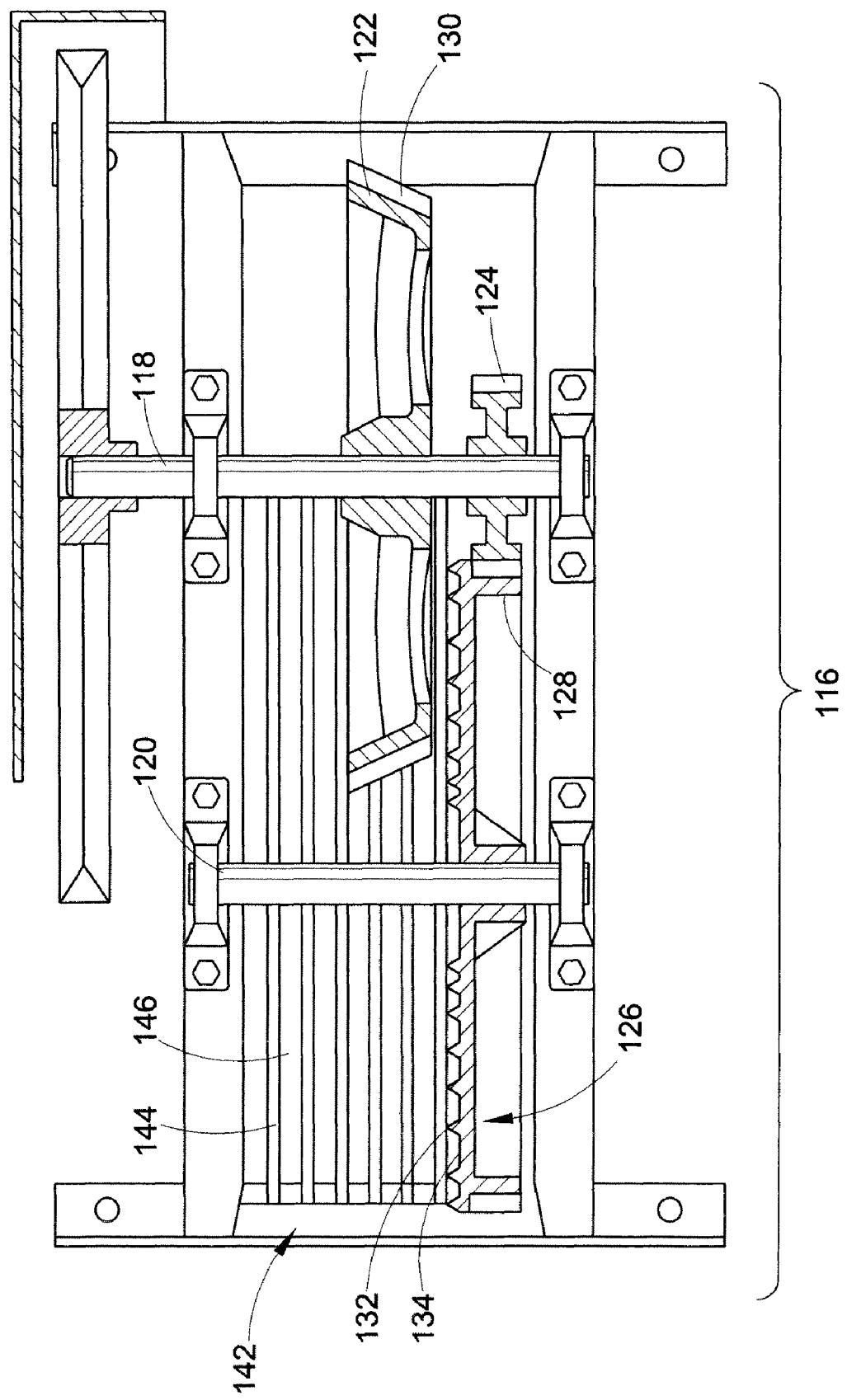
FIG. 3 is a cross sectional view of the apparatus of FIG. 2, along a section line 3-3.

With reference to FIGS. 1, 2 and 4, the second housing 104 is generally intended to receive the first finer portion of the plurality of grindings or sub-parts collected from the first stage of processing by the first housing 102. The second housing 104 further processes or grinds the plurality first sub-parts (e.g., corn kernels) into an even finer plurality of second sub-parts (e.g., corn meal). The second housing generally includes an inlet region 150 which may further include a hopper 152, a forward wall surface 154, a rear wall surface 156, and an outlet 158. Disposed internally to the second reducing or grinding housing 104 is a second reducing or grinding assembly 160. The second reducing or grinding assembly 160 includes a reducing or grinding rotor 162 having a pair of split ends 164, as well as a stationary reducing or grinding ring 166. As the first finer portion of the ground component of the agricultural product is introduced into the hopper 152, it gradually descends into the inlet 150 of the grinding assembly 160. As this occurs, the first fine portion is chopped, shredded and/or ground further via the grinding rotor 162 as it rapidly rotates within the grinding housing 104. The grinding ring 166 may include a series of apertures and other surface features or projections, such as raised ridges, teeth or pyramid like projections for further facilitating the grinding action of the second grinding assembly 160. Eventually, the first portion of the ground component is ground fine enough to pass through the apertures in the grinding ring 166 and to be ejected or discharged through the outlet 158. At this stage, the plurality of first sub-parts (or the first finer portion of the ground component) has now been converted to a plurality of second sub-parts having acquired the even finer meal-like consistency. The meal or grain can then be either directly used as feed or it can be mixed with other feed grains, nutritional supplements, or otherwise further manipulated as desired by the user.

Figure 8:
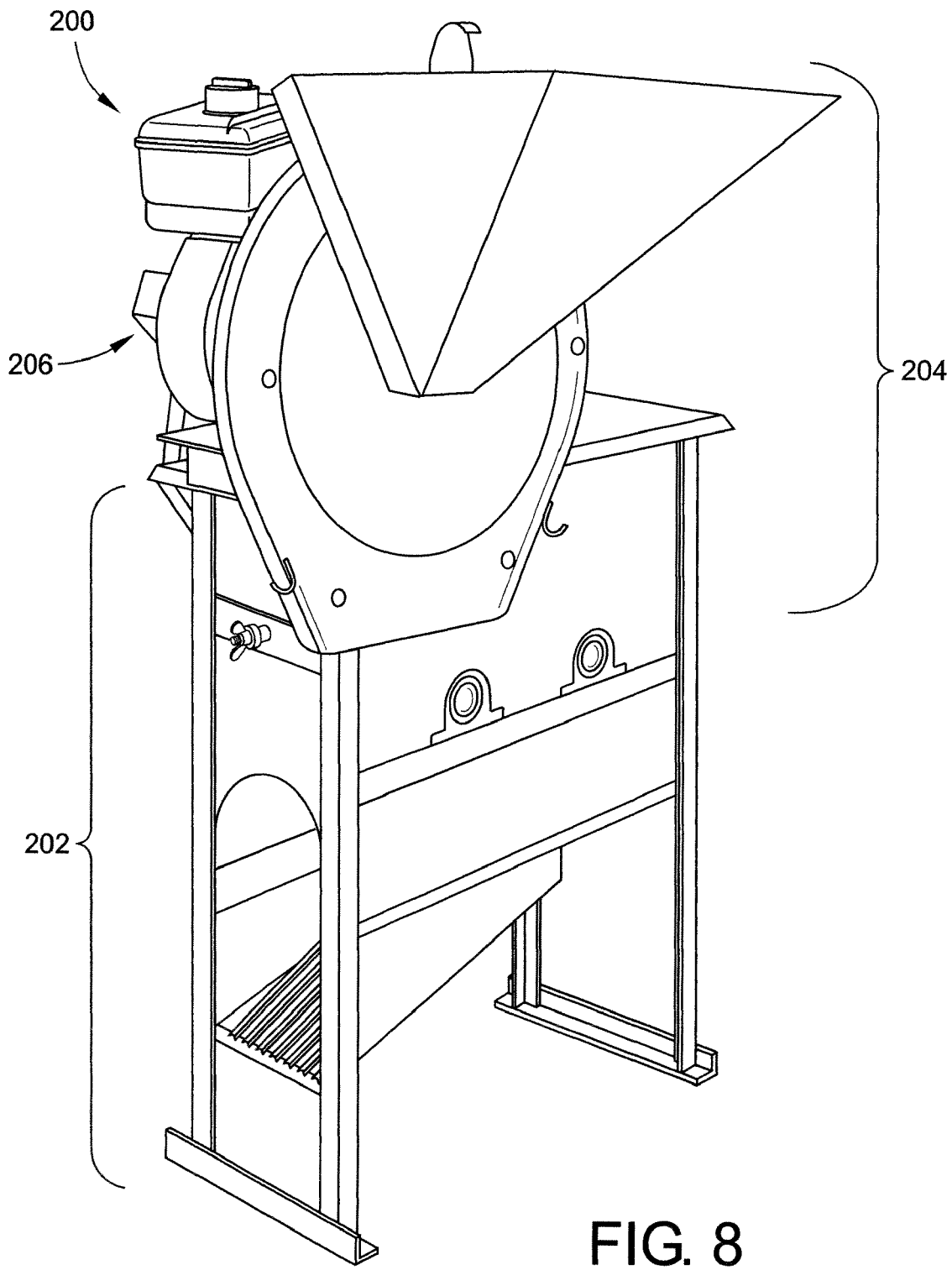
FIG. 8 is a perspective view from a front side of a second embodiment of a shelling and grinding apparatus, according to the present invention.
Figure 9:
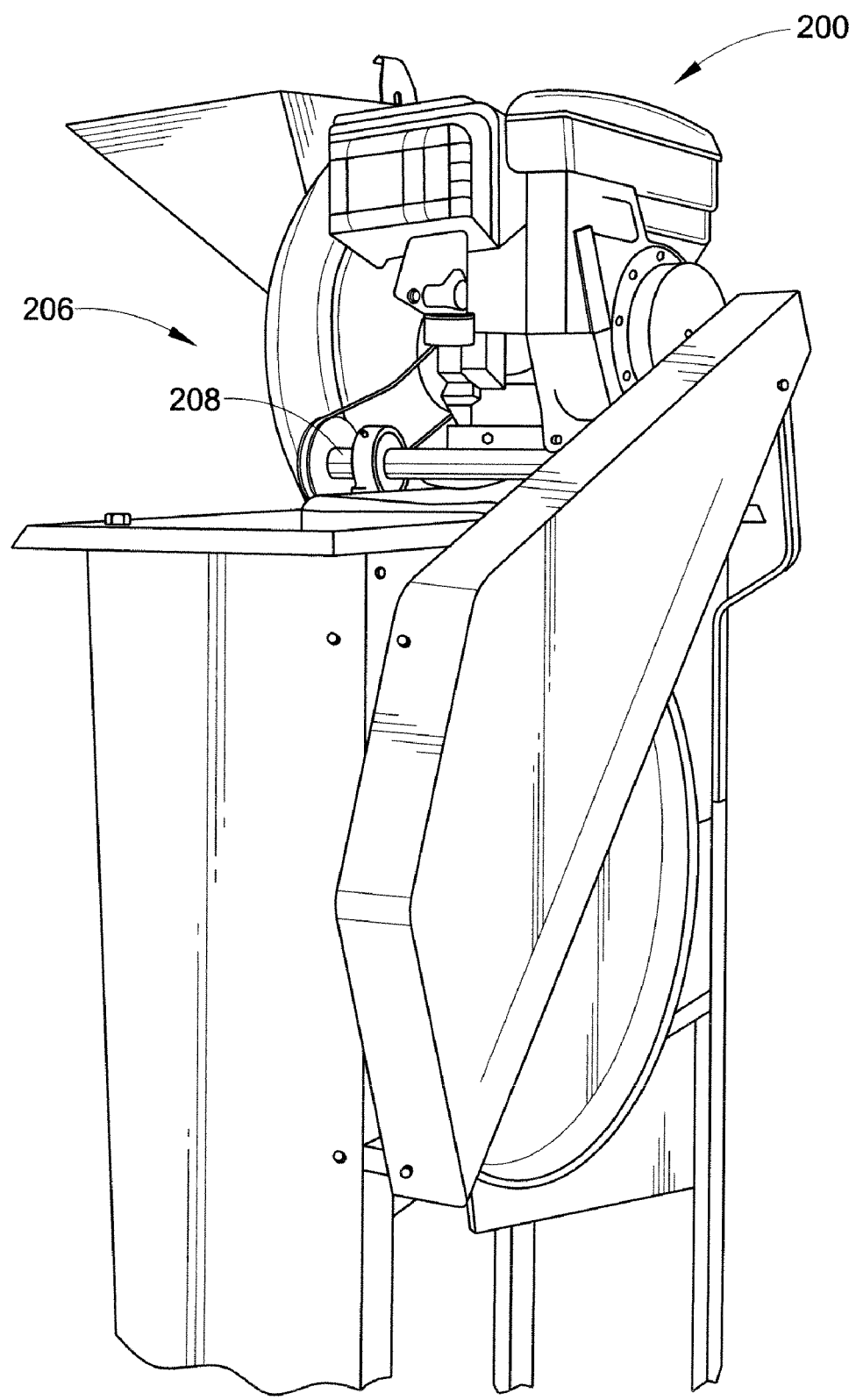
FIG. 9 is a perspective view from a rear side of the apparatus of FIG. 8 illustrating an internal combustion engine power source and a secondary drive shaft for driving a second reducing portion of the apparatus.

Now with reference to FIGS. 8-9, a second embodiment of a shelling and grinding apparatus 200 is shown. As with the first embodiment, the apparatus 200 includes a first housing 202 and a second housing 204. However, the primary difference between the first and second embodiments involves the use of an internal combustion engine 206 as the primary means for driving the grinding assemblies of the second embodiment 200. Furthermore, and with reference to FIG. 9, in order for the internal combustion engine 206 to operate both the first and second reducing assemblies, an auxiliary drive shaft 208 is provided which is driven by the internal combustion engine 206 so as to transfer power simultaneously, not only to the first reducing housing 202, but also to the second reducing housing 204. Although the second embodiment involves the use of a plurality of belts for the purpose of power transfer, it should be commonly understood that any known method for transferring power and torque can be used, such as through gears, sprockets and chains, hydraulic motors, or shafts. In all other respects, the second embodiment of the apparatus 200 operates in a substantially identical manner as the first embodiment as described previously.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An apparatus for reducing and separating an associated agricultural product into two or more sub-parts, the apparatus comprising:
   a first housing including an inlet and an outlet, the inlet being configured to receive the associated agricultural product to be reduced;
   a first reducing assembly for reducing the associated agricultural product to a plurality of first sub parts, the first reducing assembly disposed between and in communication with the inlet and the outlet of the first housing, the first reducing assembly including a first rotatable reducing member, a second rotatable reducing member, and a reaction member, wherein the first reducing member, the second reducing member and the reaction member are disposed adjacent to the other and simultaneously contact the associated agricultural product to be reduced;
   a second housing including an inlet and an outlet, the inlet being configured to receive select ones of the plurality of first sub-parts; and
   a second reducing assembly disposed between the inlet and the outlet of the second housing, the second reducing assembly including a reducing rotor and a stationary reducing ring, the reducing ring secured to the second housing and disposed around the reducing rotor with a portion of the reducing ring being disposed between the reducing rotor and the outlet of the second housing, wherein the select ones of the plurality of first sub-parts are further reduced to a plurality of second sub-parts by the second reducing assembly and discharged through the reducing ring via the outlet of the second housing.

2. The apparatus of claim 1, wherein the first reducing member is rotatably coupled to the second reducing member by an intermediate driving element for driving the second reducing member in an opposite direction to the first reducing member.

3. The apparatus of claim 1, wherein a working surface of the first reducing member rotates in a first plane generally coincident with a longitudinal axis of the inlet of the first reducing assembly and the second reducing member rotates in a second plane that is spaced from and generally parallel to the first plane.

4. The apparatus of claim 3, wherein the first reducing member, the second reducing member, and the reaction member of the first reducing assembly are arranged such that the working surface of the first reducing member, a working surface of the second reducing member, and a working surface of the reaction member form a generally triangular shape.

5. The apparatus of claim 3, wherein a working surface of the second reducing member includes a plurality of projections for engaging the associated agricultural product to be reduced.

6. The apparatus of claim 1, wherein the reaction member includes a tapered end, the tapered end being proximally located and adjacent to a working surface of the first and second reducing members.

7. The apparatus of claim 1, further including a grate disposed at the outlet of the first housing, the grate including a plurality of apertures, the plurality of apertures being sized so as to permit only select ones of the plurality of first sub-parts to pass through the grate.

8. The apparatus of claim 1, further including an adjustment assembly for advancing or retracting the stationary reaction member in a generally transverse direction with respect to a central longitudinal axis of the inlet of the first housing.

9. The apparatus of claim 8, wherein the adjustment assembly further includes a biasing member for continuously biasing the reaction member towards the central longitudinal axis of the inlet and providing a generally constant reaction pressure against the associated agricultural product to be reduced.

10. The apparatus of claim 1, wherein the apparatus is for separating and reducing corn kernels, wherein the associated agricultural product is an associated ear of corn, wherein the first housing is a shelling housing, wherein the inlet of the shelling housing is configured to receive the associated ear of corn to be shelled, wherein the first reducing assembly is a shelling assembly disposed between and in communication with the inlet and the outlet of the shelling housing, wherein the first rotatable reducing member is a first rotatable shelling member, wherein the second rotatably reducing member is a second rotatable shelling member, wherein the first shelling member, the second shelling member and the reaction member are disposed adjacent to the other and cooperate to receive and separate from the associated ear of corn a plurality of kernels and wherein the apparatus further includes a grate disposed adjacent the outlet of the shelling housing, the grate including a plurality of apertures, the plurality of apertures being sized so as to permit only the plurality of kernels to pass through the grate.

11. The apparatus of claim 10, wherein the second reducing housing is a grinding housing, the inlet of the grinding housing being configured to receive the plurality of kernels and wherein the second reducing assembly is a grinding assembly disposed between the inlet and the outlet of the grinding housing wherein the plurality of kernels are ground into a corn meal by the reducing rotor and the stationary ring of the grinding assembly and discharged via the outlet of the grinding housing.

12. An apparatus for reducing and separating an associated agricultural product into two or more sub-parts, the apparatus comprising:

a first housing including an inlet and an outlet, the inlet being configured to receive the associated agricultural product to be reduced;

a first reducing assembly disposed between and in communication with the inlet and the outlet of the first housing, the first reducing assembly including a first rotatable reducing member, a second rotatable reducing member, and a reaction member, wherein the first reducing member, the second reducing member and the reaction member are disposed adjacent to the other and cooperate to receive and reduce the associated agricultural product to a plurality of first sub-parts;

a second housing including an inlet and an outlet, the inlet being configured to receive select ones of the plurality of first sub-parts;

a second reducing assembly disposed between the inlet and the outlet of the second housing, the second reducing assembly including a reducing rotor and a stationary reducing ring, the reducing ring secured to the second housing and disposed between the reducing rotor and the outlet of the second housing, wherein the select ones of the plurality of first sub-parts are further reduced to a plurality of second sub-parts by the second reducing assembly and discharged via the outlet of the second housing; and an adjustment assembly for advancing or retracting the stationary reaction member in a generally transverse direction with respect to a central longitudinal axis of the inlet of the first housing, wherein the adjustment assembly further includes a biasing member for continuously biasing the reaction member towards the central longitudinal axis of the inlet and providing a generally constant reaction pressure against the associated agricultural product to be reduced.

13. An apparatus for reducing and separating an associated agricultural product into two or more sub-parts, the apparatus comprising:

a first housing including an inlet and an outlet, the inlet being configured to receive the associated agricultural product to be reduced;

a first reducing assembly disposed between and in communication with the inlet and the outlet of the first housing, the first reducing assembly including a first rotatable reducing member, a second rotatable reducing member, and a reaction member, wherein the first reducing member, the second reducing member and the reaction member are disposed adjacent to the other and cooperate to receive and reduce the associated agricultural product to a plurality of first sub-parts; and wherein the first reducing member includes a generally planar working surface which is rotatable in a first plane generally coincident with a longitudinal axis of the inlet of the first reducing assembly and the second reducing member is rotatable in a second plane that is spaced from and generally parallel to the first plane, and wherein the first reducing member, the second reducing member, and the reaction member of the first reducing assembly are arranged such that the working surface of the first reducing member, a working surface of the second reducing member, and a working surface of the reaction member form a generally triangular opening through which the agricultural product to be reduced is received and reduced.

14. The apparatus of claim 13, wherein the first reducing member is rotatably coupled to the second reducing member by an intermediate driving element for driving the second reducing member in an opposite direction to the first reducing member.

15. The apparatus of claim 13, wherein the working surface of the second reducing member includes a plurality of projections for engaging the associated agricultural product to be reduced.

16. The apparatus of claim 13, wherein the reaction member includes a tapered end, the tapered end being proximally located and adjacent to the working surfaces of the first and second reducing members.

17. The apparatus of claim 13, further including a grate disposed at the outlet of the first housing, the grate including a plurality of apertures, the plurality of apertures being sized so as to permit only select ones of the plurality of first subparts to pass through the grate.

18. The apparatus of claim 13, further including an adjustment assembly for advancing or retracting the stationary reaction member in a generally transverse direction with respect to the longitudinal axis of the inlet of the first housing.

19. The apparatus of claim 18, wherein the adjustment assembly further includes a biasing member for continuously biasing the reaction member towards the longitudinal axis of the inlet and providing a generally constant reaction pressure against the associated agricultural product to be reduced.

* * * * *